(12) United States Patent
Littge

(10) Patent No.: US 7,080,484 B2
(45) Date of Patent: Jul. 25, 2006

(54) PLANT WATERING SYSTEM

(76) Inventor: Donald G. Littge, 110 Anacapa Dr., Camarillo, CA (US) 93010

( * ) Notice: Subject to any disclaimer, the term of this patent is extended or adjusted under 35 U.S.C. 154(b) by 73 days.

(21) Appl. No.: 10/745,027

(22) Filed: Dec. 23, 2003

(65) Prior Publication Data
US 2005/0132646 A1 Jun. 23, 2005

(51) Int. Cl.
*A01G 27/02* (2006.01)

(52) U.S. Cl. ............................................. 47/79

(58) Field of Classification Search ............... 47/48.5, 47/32, 79, 65.5, 66.1, 66.3, 33
See application file for complete search history.

(56) References Cited

U.S. PATENT DOCUMENTS

| | | | |
|---|---|---|---|
| 2,909,328 A * | 10/1959 | Babyak | 239/268 |
| 4,056,899 A * | 11/1977 | Close | 47/79 |
| 4,067,143 A * | 1/1978 | Alwell | 47/79 |
| 4,173,098 A | 11/1979 | Smith | |
| 4,335,540 A | 6/1982 | Allen | |
| 4,961,285 A | 10/1990 | Jenkins et al. | |
| 5,212,905 A * | 5/1993 | Philoctete | 47/48.5 |
| 5,272,835 A * | 12/1993 | Stern | 47/79 |
| D399,712 S | 10/1998 | Villella | |
| 5,918,411 A * | 7/1999 | Hadrava | 47/21.1 |
| 5,992,092 A | 11/1999 | Furuta | |
| 6,070,359 A * | 6/2000 | Liu | 47/79 |
| 6,108,970 A | 8/2000 | Ball | |
| 6,138,411 A | 10/2000 | Lin | |
| 6,185,866 B1 | 2/2001 | Enfaradi | |
| 6,341,445 B1 * | 1/2002 | Morrison | 47/33 |
| 6,418,663 B1 | 7/2002 | Smith | |
| D463,318 S * | 9/2002 | McKendree | D11/143 |
| 6,516,563 B1 * | 2/2003 | Matthews | 47/66.1 |
| 6,584,730 B1 * | 7/2003 | Mai | 47/79 |
| 6,619,565 B1 * | 9/2003 | Abbott | 239/273 |
| 6,715,233 B1 * | 4/2004 | Lyon | 47/79 |

FOREIGN PATENT DOCUMENTS

| | | | |
|---|---|---|---|
| DE | 19542998 A1 * | 5/1997 | |
| EP | 1332666 A1 * | 8/2003 | |
| JP | 2003158925 A * | 6/2003 | |

* cited by examiner

*Primary Examiner*—Son T. Nguyen
(74) *Attorney, Agent, or Firm*—Holland & Knight LLP

(57) ABSTRACT

A plant watering system adapted to be communicated with a controlled pressurized water source for watering plants growing in a planting area. The system includes a water flow conduit having a first annular portion disposed in a horizontal disposition circumscribing the planting area and a cover ring disposed about and maintaining the first portion of the conduit in place about the planting area. The cover ring defines a plurality of inwardly facing cutout areas at circumferentially spaced locations thereon. A plurality of water outlet nozzles communicate with and project from the first portion of the conduit through the cutout areas in the cover ring for directing water from the conduit onto the planting area. A second portion of the conduit communicates with the first portion through one of the cutout areas in the cover ring and communicates the first portion with the pressurized water source.

17 Claims, 9 Drawing Sheets

PLANT WATERING SYSTEM

BACKGROUND OF THE INVENTION

The present invention relates to a new plant watering system that is highly efficient, versatile and visually unobtrusive. The system is adaptable for use with potted plants of varying size, as well as trees and shrubs growing in the ground. The system also is adaptable for use with a wide variety and combinations of spray, drip and misting nozzles for different applications, obviates the need to hand-water and eliminates the unsightliness and safety hazard presented by garden hoses extending about one's yard. The watering system of the present invention also substantially reduces the over-watering of some plants and under-watering of others that frequently result from the use of conventional sprinkler systems and can provide separate and different types of watering for different plants growing in a common pot.

SUMMARY OF THE INVENTION

Briefly, the watering system of the present invention comprises a water flow conduit formed of a rubber or plastic material and having a first horizontally disposed annular portion circumscribing the planting area, a second projecting leg portion that communicates the annular portion of the conduit with a controlled pressurized water supply and a plurality of nozzles that are carried by the annular portion of the conduit in a spaced disposition and communicate with the conduit interior for delivering the desired water flow to plants. An annular cover ring is provided to fit about and secure the annular portion of the water flow conduit in place about the upper end of a pot or about a tree or shrub growing in the ground.

In one embodiment, the watering system of the present invention is used with potted plants and the annular portion of the conduit is sized to correspond to the upper end of a conventional pot and is positioned adjacent that end. A leg portion of the conduit projects upwardly through the bottom of the pot and communicates an external pressurized water supply with the annular portion of the conduit. A plurality of nozzles are carried by and communicate with the interior of the annular portion of the conduit for directing water therefrom to the plants growing within the pot in a desired drip, mist or spray pattern. A cover ring preferably extends about the upper edge of the pot, the annular portion of the flow conduit and the nozzles projecting therefrom so as to secure the conduit in place on the pot and provide the system with an attractive appearance without interfering with the water flow therefrom.

Alternatively, a particularly configured pot can be provided having a channel formed at or adjacent the pot's upper end for securing the annular portion of the water flow conduit at the upper end of the pot. Appropriately positioned slots would be provided in the inner channel wall to accommodate the flow nozzles and a cover ring may or may not be employed depending upon the desired appearance. A second vertically projecting leg can be added, as desired, to the water flow conduit that communicates with the annular portion thereof and extends upwardly therefrom so as to deliver a misting spray to the upper end of a tall plant or small tree growing in the pot.

In a modified form of the present invention adapted for use with pots containing an annular array of flowers, herbs or other small plants, the cover ring extending about the upper edge of the pot the annular portion of the water flow conduit includes an inwardly disposed annular tray depending therefrom that has a generally U-shaped cross section so as to define a trough disposed about a central opening. The trough is adapted to be filled with potting soil such that an annular array of flowers or other small plants can be planted therein. Spaced cutout areas are provided in the upper end portion of the outer sidewall of the trough to accommodate the fluid flow nozzles extending inwardly therethrough from the annular portion of the water conduit. Thus water and/or fertilizer can be directed through the nozzles to the annular plant array growing in the U-shaped trough formed by the tray independently of a spray, drip and/or mist directed to a small tree or shrub growing in the main body of the pot and extending upwardly through the central opening in the tray. Alternatively, the U-shaped trough could be disposed about and depend from the outer side of the cover ring to provide the annular array of plants about the outboard side of the upper end of the pot.

For shrubs and trees growing in the ground, the annular portion of the water flow conduit is carried by a ring having a depending annular skirt portion adapted to project into the ground about and spaced from the shrub or tree for water containment and weed control. A plurality of openings are provided in the upper portion of the ring enabling nozzles to project therethrough and communicate with the annular portion of the water flow conduit for directing the desired water flow to the shrub or tree. A conventional water inlet valve is provided in the outer sidewall of the annular portion of the water flow conduit for communication of the conduit with a pressurized water supply via a length of flexible conduit. As with the prior embodiments, an upstanding vertically projecting leg can be communicated with the annular portion of the water flow conduit for directing a water flow through a spray or misting nozzle at the upper end of the tree or shrub.

DETAILED DESCRIPTION OF THE PREFERRED EMBODIMENTS

Figure 3:
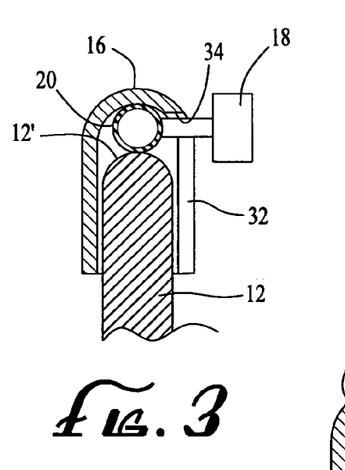
FIG. 3 is a sectional view taken along the line 3—3 in FIG. 2.
Figure 4:
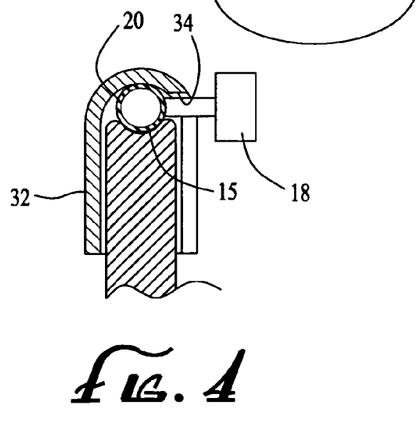
FIG. 4 is a sectional side view of a first embodiment of the present invention showing the use of the invention with a flower pot having a channel formed in the upper edge thereof to help retain the annular portion of the water conduit in place on the flower pot.
Figures 5, 6, 6A:
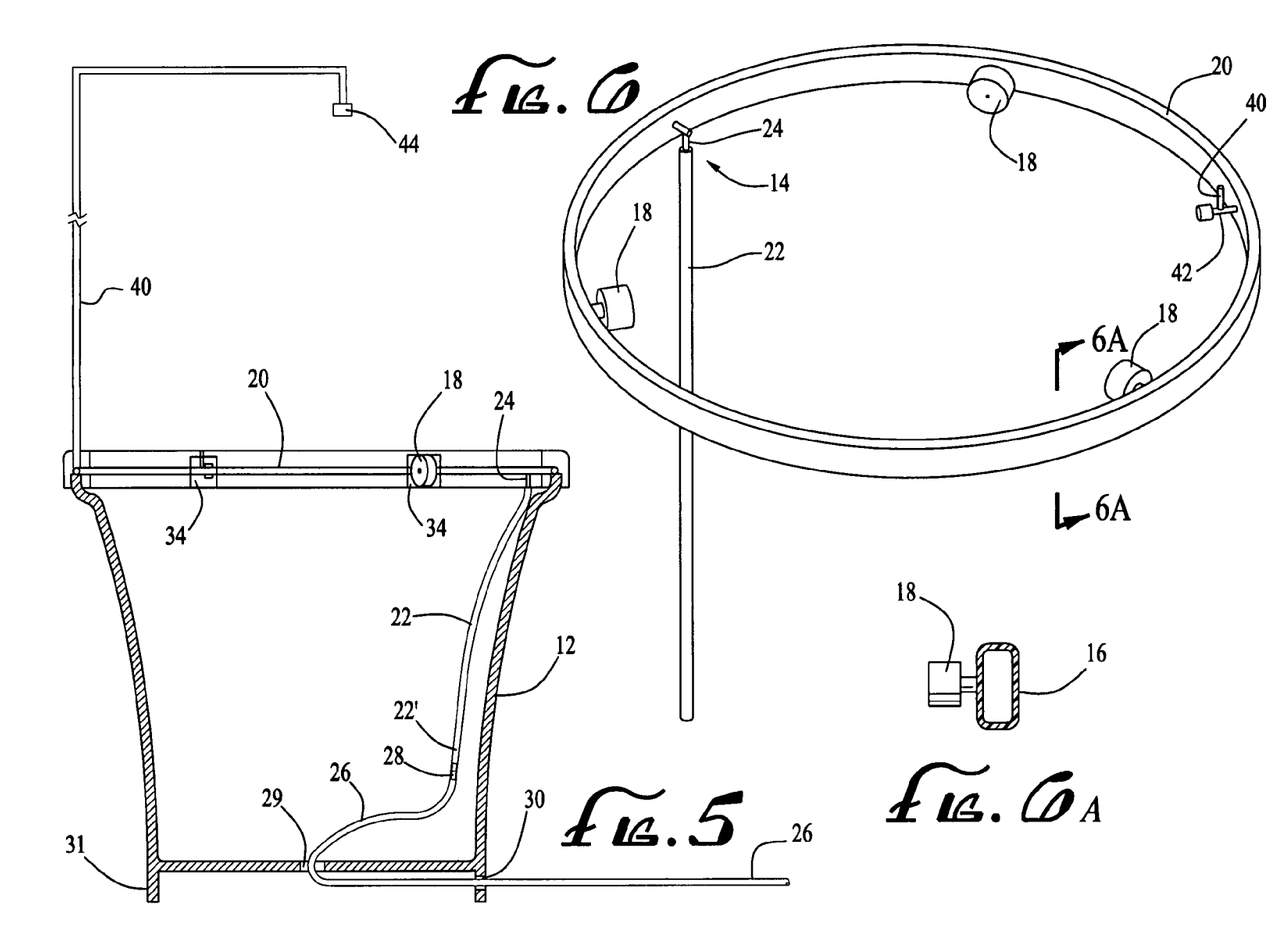
FIG. 5 is a sectional view of the first embodiment of the invention in place on a flower pot and in fluid communication with a water line.
FIG. 6 is a perspective view of a modified form of the water flow conduit employed in the first embodiment of the present invention.
FIG. 6A is a sectional view taken through the line 6A—6A in FIG. 6.
Figure 7:
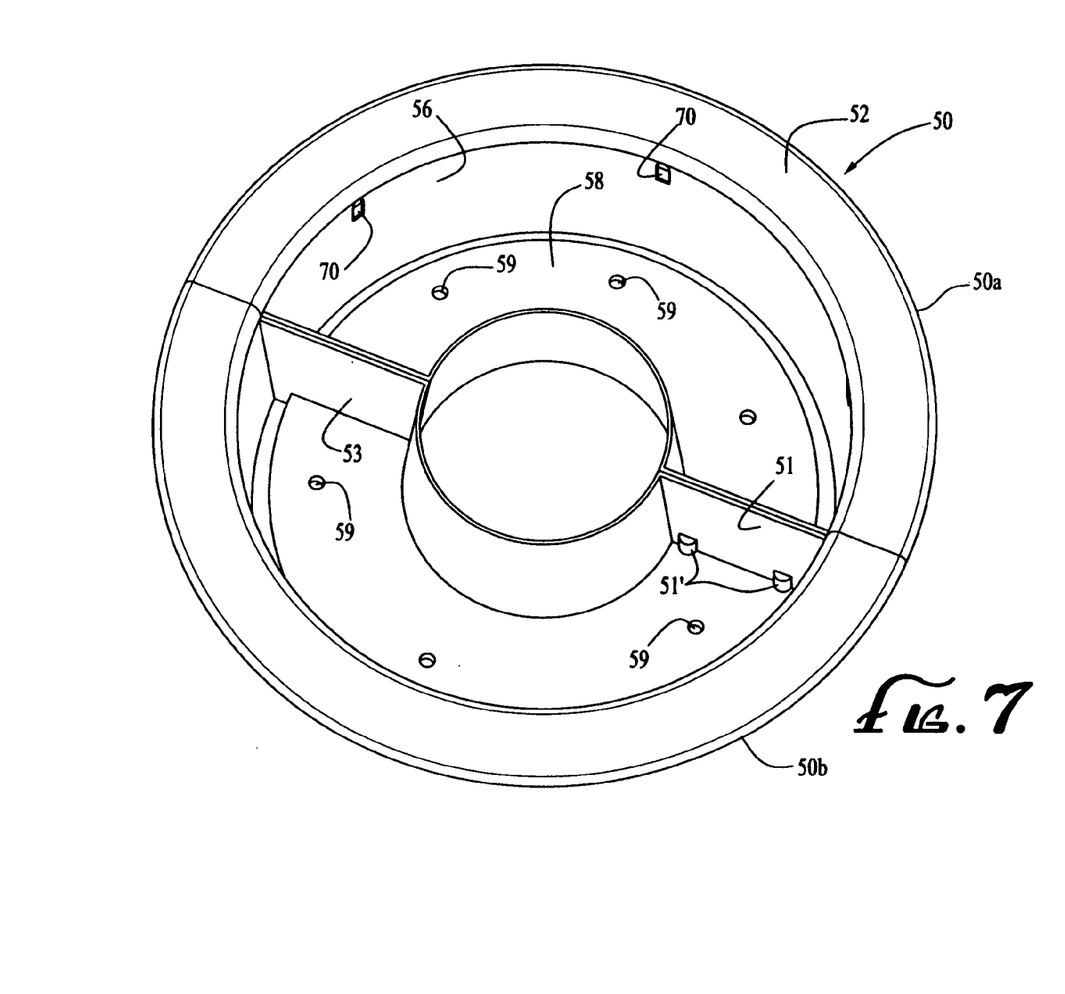
FIG. 7 is a perspective view of a second embodiment of the present invention including an annular flower tray for use on a flower pot.

The embodiment of the plant water system 10 of the present invention illustrated in FIGS. 1–6 is adapted for use with a conventional flower pot 12 and comprises a water flow conduit 14, a cover ring 16 and a plurality of water outlet nozzles 18. The water flow conduit 14 includes a first annular horizontal portion 20 defining an annular configuration for circumscribing the planting area in pot 12 and a second vertically extending leg portion 22 for communicating the annular portion of the conduit with a conventional controlled source of pressurized water (not shown) as will be described. The annular portion 20 of conduit 12 is preferably formed of a flexible weather-resistant rubber or plastic material such as that commonly used in plant drip irrigation systems and known by the common descriptor "micro tubing". Such conduit typically defines an outer diameter of about 0.25 in., although larger conduit could be employed. In this embodiment of the invention, the annular portion 20 of the water flow conduit is sized so as to circumscribe a circular area having a diameter substantially equal to that defined by the upper edge 12' of the pot 12 with which the watering system 10 is to be used. FIGS. 6 and 6A illustrate the use of an alternative larger conduit configuration. Larger diameter circular conduit could, of course, also be employed.

Figure 1:
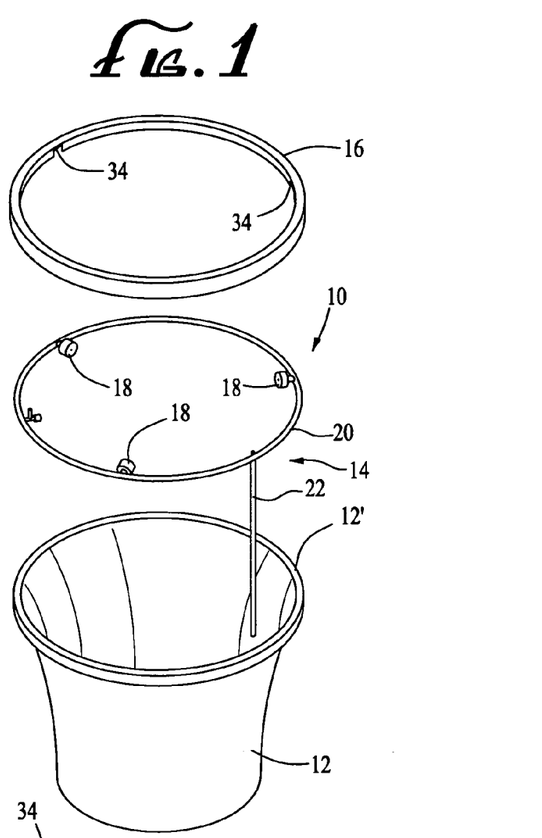
FIG. 1 is an exploded perspective view of a first embodiment of the plant watering system of the present invention.
Figure 2:
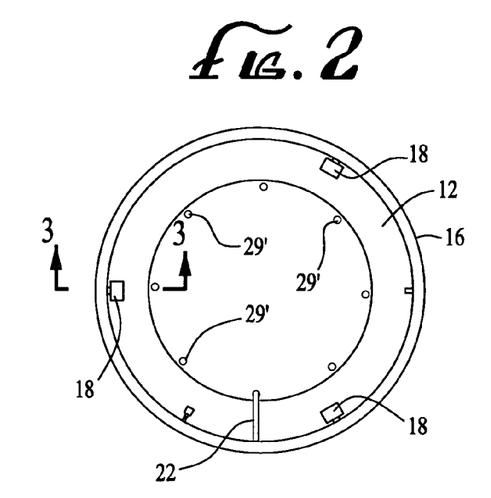
FIG. 2 is a top plan view of the first embodiment of the plant watering system of the present invention.

The leg portion 22 of the water flow conduit is preferably formed of the same 0.25 in. diameter material as the annular horizontal portion and communicates the interior of the annular portion 20 of the conduit with a controlled pressurized source of water (now shown). As seen in FIG. 5, the depending leg portion 22 of conduit 14 communicates with the horizontal annular portion 20 via a standard coupling 24, extends downwardly therefrom substantially adjacent the pot wall and communicates at its lower end 22' with a water supply line 26 via coupling 28. Supply line 26 is preferably formed of the same material as the horizontal and vertical portions 20 and 22 of water flow conduit 14 and extends from coupling 28 to the center of the pot 12 and downwardly through the center hole 29 in the bottom of the pot and radially outwardly therefrom, preferably through an opening 30 formed in an annular base wall 31 provided at the bottom of the pot from which line 26 extends to a conventional water flow control valve (not shown). Alternatively, the water flow conduit 14 could extend through one of a plurality of small holes 29' located about the perimeter of the bottom of the pot as shown in FIG. 2. Also, conduit 14 could include a lower generally horizontally disposed section extending from coupling 28, through the center hole 29 in the bottom of the pot and through opening 30 where the extended end of the section would be coupled to the water supply line 26. Other ways of extending the water flow conduit 14 out of the flower pot 12 could also be employed.

A plurality of water outlet nozzles 18 are carried by and preferably equally spaced about the annular portion 20 of conduit 14. Nozzles 18 can communicate with the interior of conduit portion 20 by means of a threaded connection or a bayonet-type connection. Nozzles 18 can define a desired spray pattern, function as a mister or as a drip irrigation nozzle, depending on the desires of the user. An example of a spray nozzle used in the present invention is marketed under the name DripMaster, model no. 61035W, by Orbit Irrigation Products, Inc., located in Bountiful, Utah. An adjustable drip nozzle suitable for use in the present invention is marketed by Dig Irrigation Products of Vista, Calif. under the model designation B02B.

The cover ring 16 is preferably formed of a durable plastic-type material and defines an inverted generally U-shaped flange 32 adapted to extend over and about the upper edge portion 12' of the pot 12 and hold the annular horizontal portion 20 of the water flow conduit 14 in place on the pot (see FIG. 3). Slots or otherwise configured openings 34 are provided in the interior wall 32' of flange 32 at uniformly-spaced intervals about the cover ring 16 to accommodate the fluid flow nozzles 18 and the coupling 24 between conduit portions 20 and 22. Slots 34 can be either preformed at varying intervals about the cover ring or be of the punch-out type wherein a plurality of slot locations are circumscribed with suitable scoring such that the material interior of the scorings can be easily knocked-out by the user to define the nozzle access slots at the desired locations.

When used with a small potted tree or shrub, it may be desirable to provide a misting element above the plant. This is easily accomplished with the present invention by simply adding a second vertical leg portion 40 that communicates with the water flow conduit 14 through one of the slots 34 in the interior sidewall of cover ring 16 via a conventional coupling 42. In such applications, the coupling 42 could simply replace one of the fluid flow nozzles 18 or be added in addition to the plurality of fluid flow nozzles carried by the annular portion 20 of conduit 14. A mister 44 would be provided at the upper end of the second leg portion 40 of the water flow conduit 14 as seen in FIG. 5.

If desired, a flower pot could be particularly configured for use with the plant water system. An example of one such pot is shown in FIG. 4. As seen therein, pot 13 could define an annular groove 15 in the upper end thereof to accommodate the horizontal portion 20 of conduit 14. If a deeper groove is used, a plurality of slots or other apertures could be provided in the inner sidewall of the groove to accommodate the water outlet nozzles 18. Alternatively, scoring for such areas could be provided as in the prior embodiment. While the groove would hold the water conduit in place, a suitably sized and configured cover ring 19 could be provided to extend around and about the upper end of the pot for aesthetic reasons.

A second embodiment of the present invention is illustrated in FIGS. 7–10 that is adapted for use in pots to irrigate separately an annular array of flowers, herbs or other small plants growing about a different type of plant, i.e., a small tree or shrub. For such applications, the cover ring 16 of the prior embodiment is replaced with a cover ring 50. Cover ring 50 includes a radially projecting upper flange portion 52 that extends over and about the upper edge 12' of the flower pot 12, an annular exterior depending flange 54 that cooperates with an outer annular sidewall 56 of cover ring 50 to hold the annular horizontal portion 20 of the water flow conduit 14 therebetween and an inner annular side wall 57 that cooperates with outer wall 56 to define generally U-shaped annular trough portion 58 that extends about a central opening 60. This U-shaped trough portion 58 of the cover is provided with a plurality of drainage holes 59 in the bottom thereof and carries the soil within which flowers, herbs or other small plants are planted in an annular array. The remainder of the pot 12 is also filled with potting soil and a small tree or shrub is preferably planted therein that extends upwardly through the central opening 60 defined by cover ring 50 (see FIG. 10). Again, the water flow conduit 14 can be formed of micro tubing, although, if desired, the annular horizontal portion 20 could be formed of a somewhat less flexible and larger diameter plastic material. It should be noted that such a configuration, absent the annular trough portion 58, could be utilized as an alternative configuration for the cover ring 16 of the prior embodiment.

Figure 8:
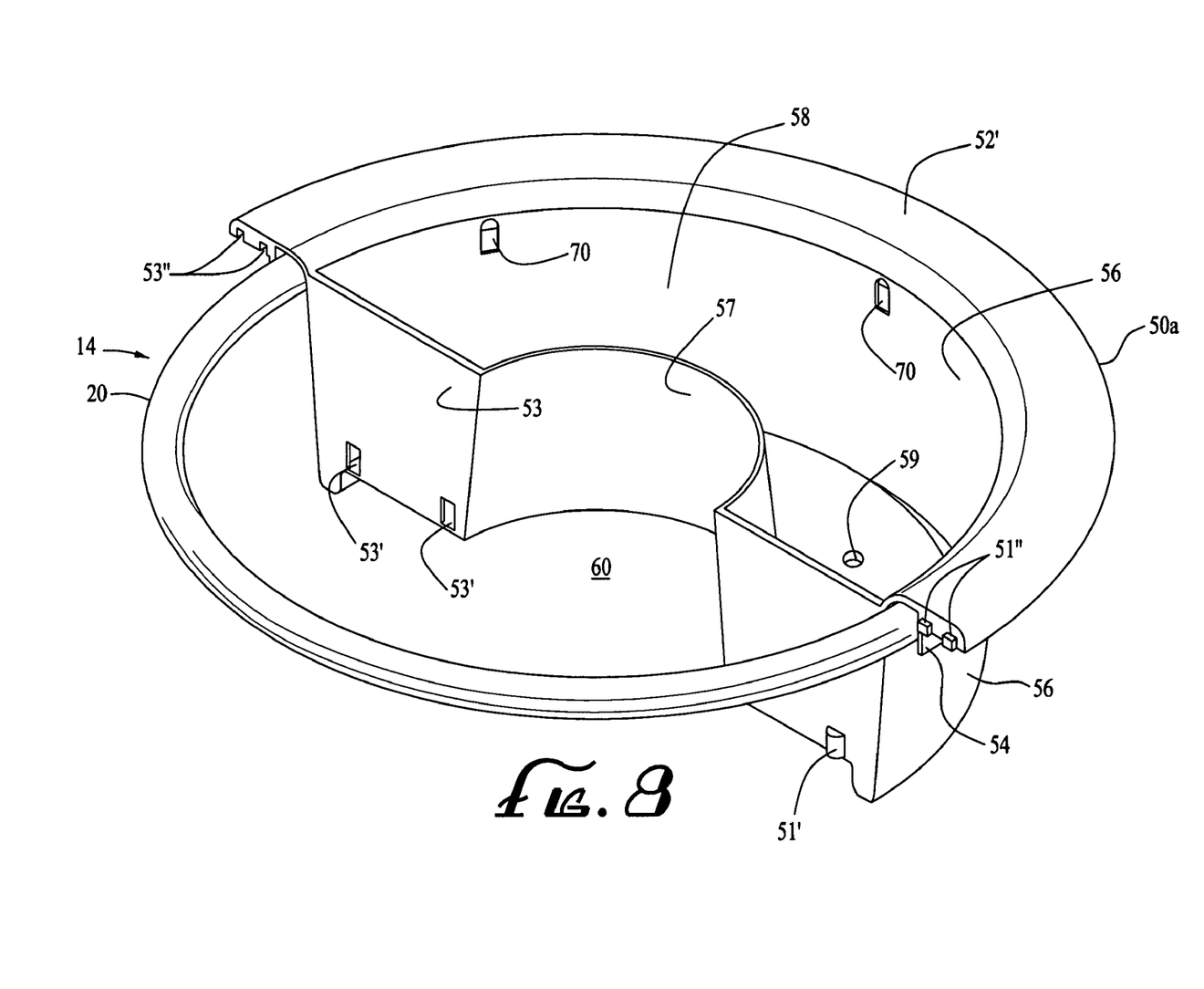
FIG. 8 is a perspective view of the second embodiment of the present invention with one of the sections removed to illustrate the modular construction thereof.

To accommodate a small tree or shrub, the cover ring 50 is preferably formed in two sections 50a and 50b so that the tree or shrub can be planted in the pot and the cover ring 50 can be positioned about the trunk portion thereof. Preferably, each of the cover ring sections 50a and 50b is provided with an end wall 51 and 53 to contain the soil therein and prevent water leakage between the abutting ends of the two cover ring portions. Cooperating lock tabs 51' and slots 53' are provided in the end walls 51 and 53 for aligning and securing the two ring sections together in a press fitment. Tabs 51" and slots 53" are also preferably provided in the ends of the flange portions 52' defined by the cover ring sections 50a and 50b as is illustrated in FIG. 8 (only one ring section 50a being shown). Other attachment and alignment means also could be employed in addition to or in lieu of the aforesaid tabs and slots. As with cover ring 16, openings 70 are provided in the upper end portions of the outer wall portion 62 of cover ring 50 to accommodate the plurality of spaced nozzles 18. Again, openings 70 can be preformed or fabricated so as to be knocked out as needed. Thus, cover ring 50, cooperates with the water flow conduit 12 and nozzles 18 in the same manner as cover ring 16 and is adaptable for use with a second vertically projecting leg 40 for providing a mister 44 above the tree or shrub growing through the central opening 60 (see FIG. 10).

Figure 9:
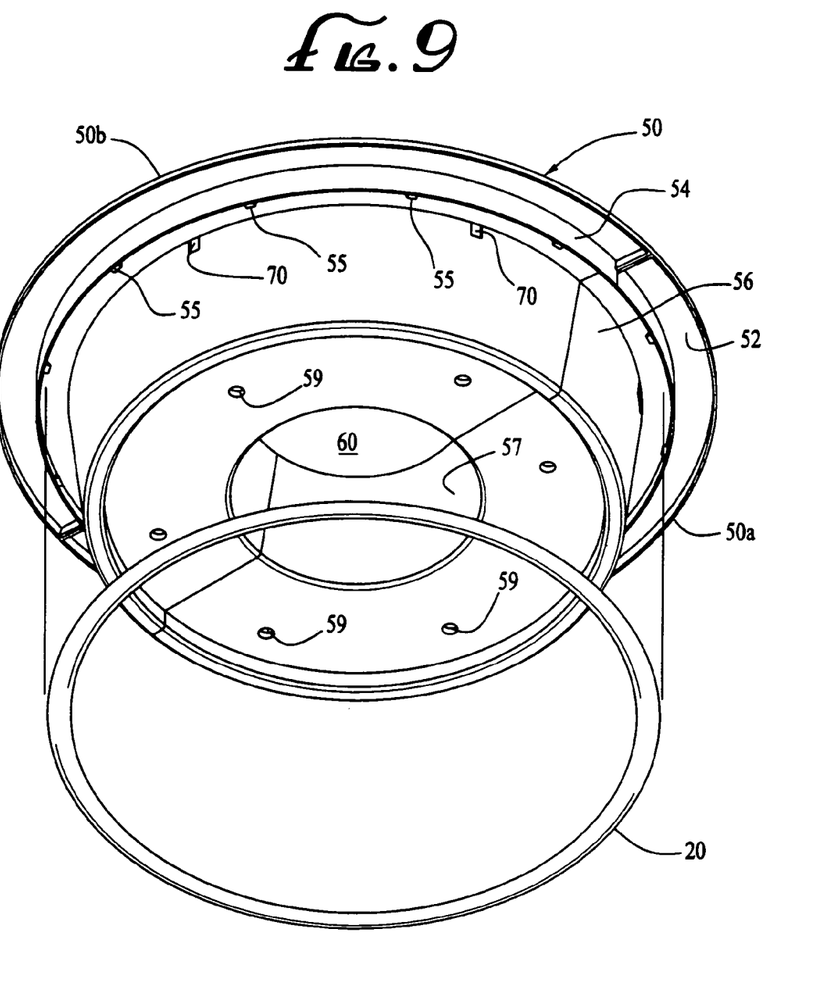
FIG. 9 is a perspective view of the second embodiment of the present invention illustrating the underside thereof and the attachment of the annular portion of the water flow conduit to the cover ring.
Figure 10:
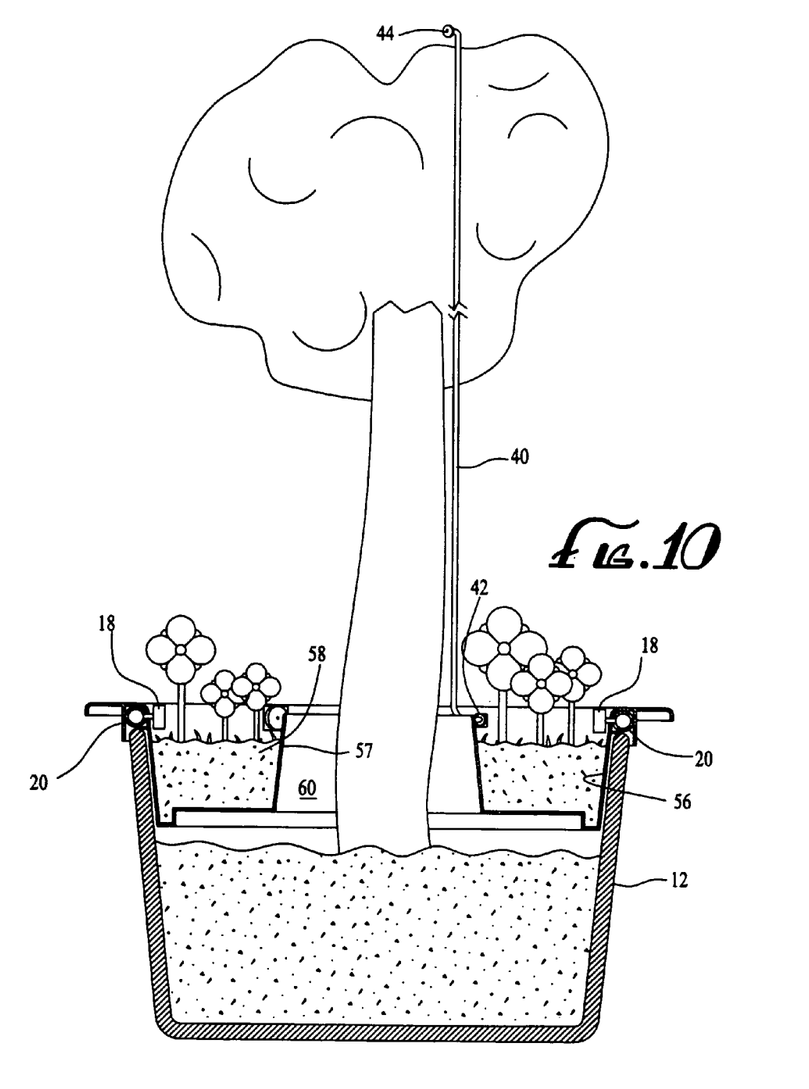
FIG. 10 is a side view of the second embodiment of the present invention with a portion of the flower pot broken away and illustrating the use thereof with an elevated misting element.

In use, after the two sections 50a and 50b of the cover ring 50 are placed in an abutting relationship (see FIG. 9), the horizontal annular portion 20 of the water flow conduit is pressed into place between sidewall 56 and flange 54, or as in FIG. 9, between side wall 56 and securement tabs or fingers 55 provided on flange 54. Because the centrally disposed shrub or small tree will be planted in the pot prior to the positioning of the cover ring 50 on the pot, the horizontal conduit portion 20 is pressed into place about the joined cover ring portions and the extended ends of conduit portion 20 are then joined together in a conventional manner to form the annular conduit.

Figure 11:
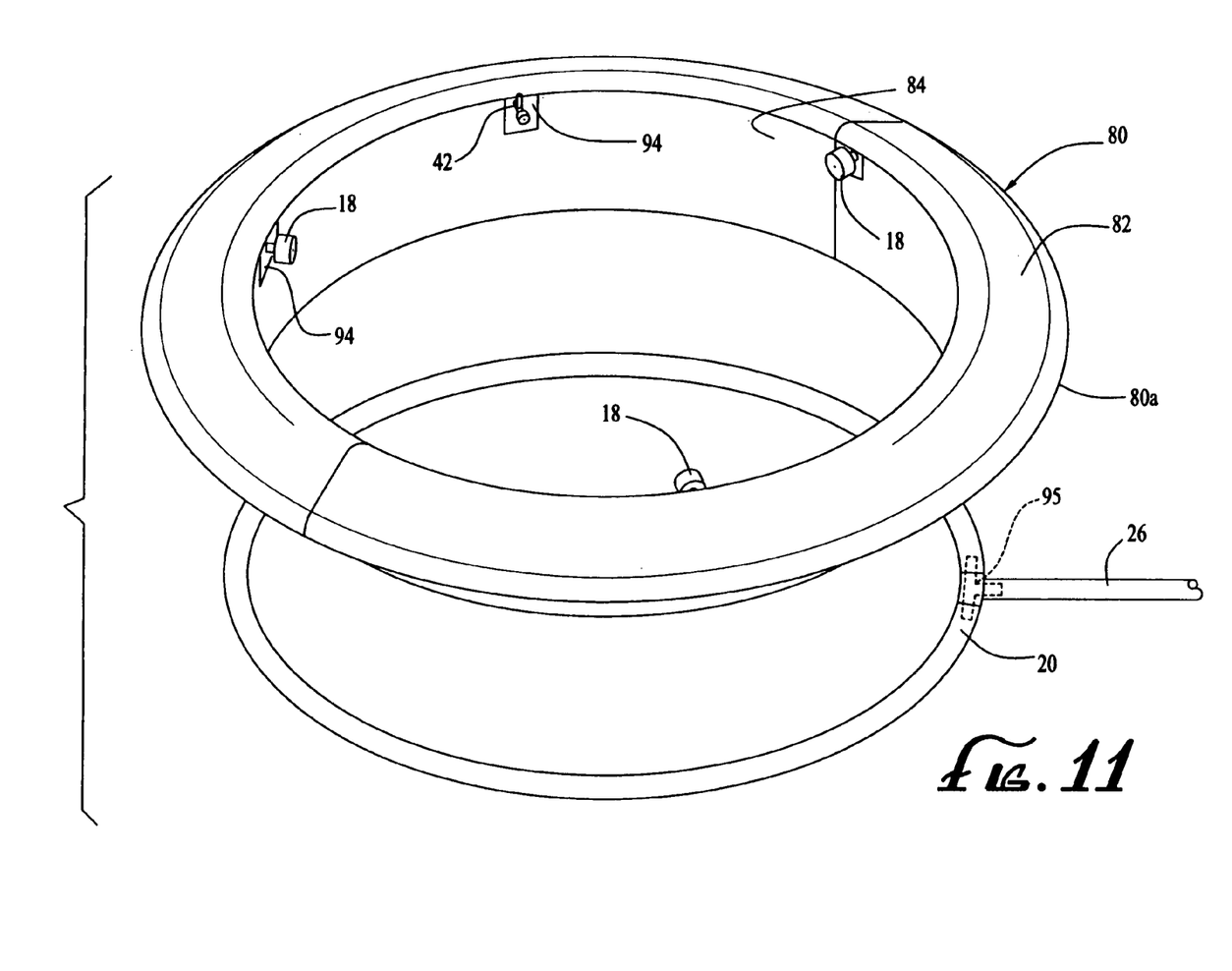
FIG. 11 is a perspective view of a third embodiment of the present invention adapted for use with plants growing in the ground.
Figure 12:
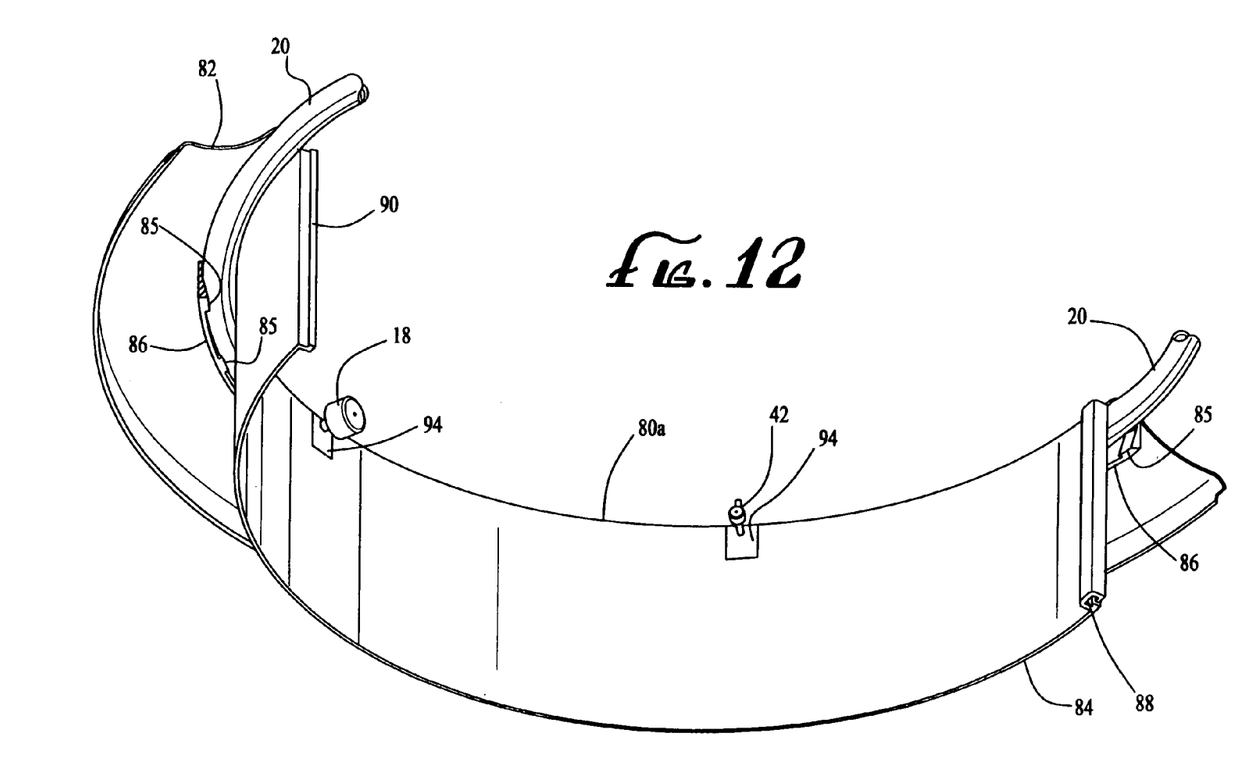
FIG. 12 is a perspective view of a semicircular section of the third embodiment of the present invention showing the securement of the annular portion of the water flow conduit to the cover ring.
Figure 13:
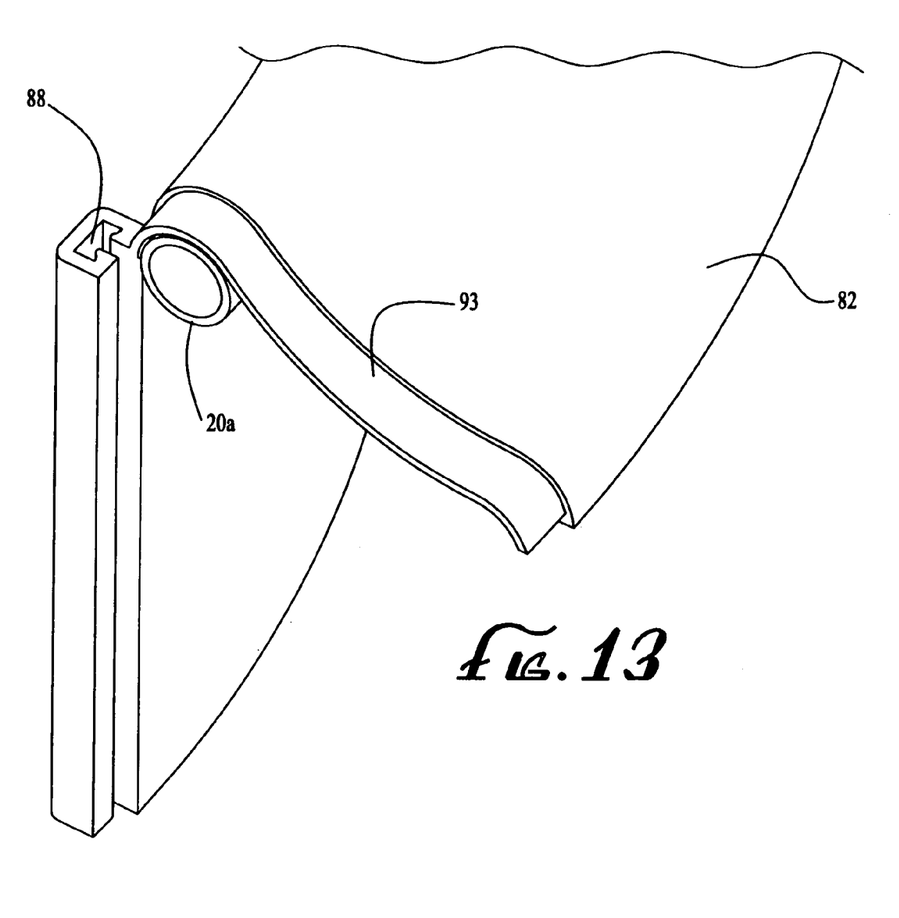
FIG. 13 is an enlarged partial perspective view of an end portion of one of the sections of the third embodiment of the present invention.

The plant water system of the present invention is also adaptable for use with shrubs and trees growing in the ground. As seen in FIGS. 11–13, such a modified form of the invention comprises a cover ring 80, generally constructed in multiple sections to enable the ring to be placed about the tree or shrub. In the configuration of cover ring 80 shown in the drawings, two such sections are utilized. In general, the larger the diameter of the cover ring 80, the greater the number of sections the ring comprises. Each ring section 80a comprises an upper radially extending flange portion 82 for concealing the water flow conduit and a depending skirt portion 84 that is adapted to extend into the ground and function as a water dam and weed deterrent. The water flow conduit employed with ring 80, like the annular horizontal portion 20 of the prior embodiments is preferably formed of flexible micro tubing and is extended about the upper end of the skirt portions 84 of the ring sections and the ends joined together after the ring sections are joined together in an annular array as will be described. Segments of the conduit portion 20 are then held in place on the ring by retention members 85 on depending flanges 86 as in the prior embodiment.

To secure the individual ring sections together, each section may be provided with a vertically extending channel 88 at one end thereof and a vertically extending rib 90 at the other end of the section. The channels and ribs are configured so as to define a mating relationship upon the rib at the end of one section being slided into the channel at the end of an adjacent section. The interlocking ribs and channels would maintain the ring sections in an adjacent disposition providing structural integrity for the ring. Again, other means for securing and aligning the ring sections together could be employed. Additionally, outwardly extending recessed areas 93 are preferably provided in the flange portion 82 (see FIG. 13) that are adapted to receive correspondingly-sized overhanging portions (not shown) in the flange portion of the adjacent ring section to provide a relatively seamless appearance.

Because the ring 80 is generally formed in multiple sections, it may be desirable to mold or extrude an arcuate segment of the annular water flow conduit into each ring section 80a. In such a configuration, each ring section 80a would have a hollow arcuate conduit segment integrally formed therewith between the juncture of the skirt and flange portions 84 and 82 of the ring section. Such a conduit configuration would have the appearance of the conduit segment 20a shown in FIG. 13, but the ring section employing such an integrally formed conduit should employ a differently configured ring securement mechanism (horizontal attachment numbers as opposed to vertical channels 88 and ribs 90) to accommodate conventional conduit attachment insert (not shown) in the ends of the conduit segments 20a so that the ring assembly will not leak. A vertical attachment mechanism like that shown in FIGS. 12 and 13 would not accommodate such inserts.

As with the prior embodiments, support ring 80 is provided with either preformed or punch-out slots 94 adjacent the upper ends of the skirt portion 84 thereof to accommodate a plurality of fluid flow nozzles 18 and enable the nozzles to communicate with the water flow conduit 92 positioned on the outboard side of slots 94. As with the prior embodiments, the ring 80 also is adaptable for use with a vertical arm extension to provide a mister atop the tree or shrub growing within the ring. Because ring 80 is not situated above the ground as are the prior embodiments when carried by a pot, a vertically projecting leg portion is not required to communicate the horizontally disposed annular water flow conduit 92 with a controlled pressurized source of water. Instead, the supply line 26' communicates the pressurized supply of water directly with the annular water flow conduit carried by support ring 80 through a conventional press fit connector 95.

In addition to use with other ring sections as above-described, a single section 80a could be used with a finite length of micro tubing or other conduit and one or more water outlet nozzles (preferably of the drip type) on, for example, a hillside below a shrub, tree or small planting area to water the plant/area and provide a water dam. Typically, a plurality of such ring sections would be utilized on a hillside and the conduits therein would be joined together, in series, by lengths of micro tubing. Other changes and modifications may be made in carrying out the present invention, without departing from the spirit and scope thereof. Insofar as such changes and modifications are within the purview of the appended claims, they are to be considered as part of the present invention.

I claim:

1. A system adapted to be communicated with a controlled pressurized water source for watering plants growing in a flower pot, said system comprising:
   a water flow conduit including an annular portion disposed in a substantially horizontal disposition about an upper end portion of the flower pot;
   a cover ring disposed about said annular portion of said conduit and the upper end portion of the flower pot for maintaining said first portion of said conduit in place on the flower pot, said cover ring defining a plurality of inwardly facing cutout areas at circumferentially-spaced locations thereon and including a generally U-shaped annular trough, said trough being disposed interiorly of said ring and circumscribing a centrally disposed open area;
   a plurality of water outlet nozzles communicating with and projecting from said annular portion of said conduit through said cutout areas for directing water from said conduit into said flower pot, at least a portion of said nozzles directing water from said conduit into said trough for the watering of plants growing therein; and
   means for communicating said first portion of said conduit with the water source.

2. The system of claim 1 wherein said communicating means comprises a vertical leg portion communicating with said first portion of said conduit through one of said cutout areas in said covering and extending downwardly therefrom within the pot.

3. A system adapted to be communicated with a controlled pressurized water source for watering plants growing in a flower pot, said system comprising:
   a water flow conduit including an annular portion and an arm portion, said annular portion being disposed in a substantially horizontal disposition about an upper end portion of the flower pot;
   a cover ring disposed about said annular portion of said conduit and the upper end portion of the flower pot for maintaining said first portion of said conduit in place on the flower pot, said cover ring defining a plurality of inwardly facing cutout areas at circumferentially-spaced locations thereon and including a generally U-shaped annular trough, said trough being disposed interiorly of said ring and circumscribing a centrally disposed open area;
   a plurality of water outlet nozzles communicating with and projecting from said annular portion of said conduit through said cutout areas for directing water from said conduit into said flower pot, at least a portion of said nozzles directing water from said conduit into said trough for the watering of plants growing therein and wherein said arm portion of said conduit communicates with said annular portion thereof through one of said cutout areas in said cover ring for watering said open area; and
   means for communicating said annular portion of said conduit with the water source.

4. The system of claim 3 wherein said communicating means comprises a vertical leg portion communicating with said first portion of said conduit through one of said cutout areas in said covering and extending downwardly therefrom within the pot.

5. A system adapted to be communicated with a controlled pressurized water source for watering plants growing in a flower pot, said system comprising:
   a water flow conduit including an annular portion and a vertically extending arm portion, said annular portion being disposed in a substantially horizontal disposition about an upper end portion of the flower pot;
   a cover ring disposed about said annular portion of said conduit and the upper end portion of the flower pot for maintaining said first portion of said conduit in place on the flower pot, said cover ring defining a plurality of inwardly facing cutout areas at circumferentially-spaced locations thereon and including a generally U-shaped annular trough, said trough being disposed interiorly of said ring and circumscribing a centrally disposed open area;
   a plurality of water outlet nozzles communicating with and projecting from said annular portion of said conduit through said cutout areas for directing water from said conduit into said flower pot, at least a portion of said nozzles directing water from said conduit into said trough for the watering of plants growing therein and wherein said vertically extending arm portion of said conduit communicates with said annular portion of said conduit through one of said cutout areas in said cover ring;
   a water outlet nozzle and communicating with said vertically extending portion of said conduit for watering said centrally disposed open area; and
   means for communicating said annular portion of said conduit with the water source.

6. The system of claim 5 wherein said water outlet nozzle communicating with said vertically extending portion of said conduit is a misting type nozzle.

7. A system adapted to be communicated with a controlled pressurized water source for watering plants growing in a flower pot, said system comprising:
   a water flow conduit including an annular portion disposed in a substantially horizontal disposition about an upper end portion of the flower pot;
   a cover ring disposed about said annular portion of said conduit and the upper end portion of the flower pot for maintaining said first portion of said conduit in place on the flower pot, said cover ring defining a plurality of inwardly facing cutout areas at circumferentially-spaced locations thereon and including a generally U-shaped annular trough, said trough being disposed adjacent said ring and circumscribing a centrally disposed open area;
   a plurality of water outlet nozzles communicating with and projecting from said annular portion of said conduit through said cutout areas for directing water from said conduit into said flower pot, at least a portion of said nozzles directing water from said conduit into said trough for the watering of plants growing therein; and
   means for communicating said first portion of said conduit with the water source.

8. A system adapted to be communicated with a controlled pressurized source of water for watering plants growing in a flower pot, said system comprising:
   a water flow conduit including first and second portions, said first portion being of an annular configuration and adapted to be disposed in a substantially horizontal disposition about an upper end portion of the flower pot;
   a cover ring adapted to be disposed about said first conduit portion and an upper end portion of the flower pot for maintaining said first portion of said conduit in place on the flower pot, said cover ring defining a plurality of inwardly facing cutout areas at circumferentially-spaced locations thereon and including a generally U-shaped annular trough, said trough being disposed interiorly of said ring and circumscribing a centrally disposed open area;

a plurality of water outlet nozzles communicating with and projecting from said first portion of said conduit through said cutout areas for directing water from said conduit into the flower pot at least a portion of said nozzles directing water from said conduit into said trough for the watering of plants growing therein; and wherein said second portion of said conduit communicates with said first portion and extends downwardly therefrom for communicating the first portion of said conduit with a pressurized water source.

9. The system of claim 8 wherein said second portion of said conduit communicates with said first portion thereof through one of said cutout areas in said cover ring.

10. A system adapted to be communicated with a controlled pressurized source of water for watering plants growing in a flower pot, said system comprising:

a water flow conduit including first and second portions, said first portion being of an annular configuration and adapted to be disposed in a substantially horizontal disposition about an upper end portion of the flower pot;

a cover ring adapted to be disposed about said first conduit portion and an upper end portion of the flower pot for maintaining said first portion of said conduit in place on the flower pot, said cover ring defining a plurality of inwardly facing cutout areas at circumferentially-spaced locations thereon and including a generally U-shaped annular trough, said trough being disposed interiorly of said ring and circumscribing a centrally disposed open area;

a plurality of water outlet nozzles communicating with and projecting from said first portion of said conduit through said cutout areas for directing water from said conduit into the flower pot at least a portion of said nozzles directing water from said conduit into said trough for the watering of plants growing therein;

wherein said second portion of said conduit communicates with said first portion and extends downwardly therefrom within the flower pot for communicating the first portion of said conduit with a pressurized water source; and wherein said conduit additionally includes a vertically extending arm portion communicating with said first portion thereof, said arm portion extending upwardly from said cover ring and including a nozzle communicating therewith for providing water from an elevated location.

11. The system of claim 10 wherein said vertically extending arm portion of said conduit communicates with said first portion thereof through one of said cutout areas.

12. The system of claim 10 wherein said second portion of said conduit communicates with said first portion thereof through one of said cutout areas in said cover ring.

13. A system adapted to be communicated with a controlled pressurized water source for watering plants growing in a flower pot, said system comprising:

a water flow conduit including an annular portion disposed in a substantially horizontal disposition about an upper end portion of the flower pot;

a cover ring disposed about said annular portion of said conduit and the upper end portion of said flower pot so for maintaining said annular portion of said conduit in place on the flower pot, said cover ring defining a plurality of inwardly facing cutout areas at circumferentially-spaced locations thereon, and including an annular trough, said trough being disposed interiorly of said ring and circumscribing a centrally disposed area;

a plurality of circumferentially-spaced and inwardly facing water outlets in said annular portion of said conduit, said water outlets being aligned with said cutout areas for directing water from said conduit into said pot; and means for communicating said first portion of said conduit with the water source.

14. The system of claim 13 including a plurality of water outlet nozzles adapted to extend through said water outlets in said first conduit for directing water from said conduit into said pot in a desired spray configuration.

15. A system adapted to be communicated with a controlled pressurized water source for watering plants growing in a flower pot, said system comprising:

a water flow conduit including first and second portions, said first portion being of an annular configuration and adapted to be disposed in a substantially horizontal disposition about an upper end portion of the flower pot;

a cover ring disposed about said first portion of said conduit and the upper end portion of the flower pot for maintaining said first portion of said conduit in place on the flower pot, said cover ring defining a plurality of inwardly facing cutout areas at circumferentially-spaced locations thereon and including a generally U-shaped annular trough, said trough being disposed interiorly of said ring and circumscribing a centrally disposed open area;

a plurality of circumferentially-spaced and inwardly facing water outlets in said first portion of said conduit, said outlets being aligned with said cutout areas for directing water from said conduit into said pot; and wherein said second portion of said conduit is adapted to communicate with said first portion and extends downwardly therefrom for communicating the first portion of said conduit with the pressurized water source.

16. The system of claim 15 including a plurality of water outlet nozzles adapted to extend through said water outlets in said first conduit for directing water from said conduit into said pot in a desired spray configuration.

17. The system of claim 16 wherein said water outlet nozzles are selected from the group consisting of spray nozzles, drip nozzles and misting nozzles.

* * * * *